Patented Aug. 31, 1954

UNITED STATES PATENT OFFICE 2,687,946

PRODUCTION OF SULFUR DIOXIDE

John Manning and William Hector Maclennan, Norton-on-Tees, England, assignors to Imperial Chemical Industries Limited, a corporation of Great Britain No Drawing. Application March 21, 1951, Serial No. 216,843

Claims priority, application Great Britain April 4, 1950

6 Claims. (Cl. 23—177)

This invention relates to the production of sulphur dioxide and more particularly to the production of sulphur dioxide for use in the manufacture of sulphuric acid by known processes.

It is already known to use naturally occurring calcium sulphate as a source of lime in the manufacture of cement, the calcium sulphate material being heated with coal and ash in rotary kilns of the type usually employed in this art. The flue gases leaving the kilns contain sulphur dioxide from the decomposition of the calcium sulphate but this is accompanied by large volumes of other gases chiefly the products of combustion of the fuel and any excess air used.

In contradistinction to these the present invention provides a process for the continuous production of sulphur dioxide from naturally occurring calcium sulphate in considerably higher concentration than that obtained by known processes and therefore particularly advantageous for use in processes for the production of sulphuric acid.

According to the present invention there is provided a continuous process for the production of sulphur dioxide which comprises charging to at least one externally heated vertical retort a mixture containing calcium sulphate carbonaceous material and silica whereby the mixture is indirectly heated, in the absence of added oxygen, to a temperature within the range of 900° C. to 1400° C. and the calcium sulphate is decomposed to give a gaseous mixture rich in sulphur dioxide.

The gaseous mixture containing sulphur dioxide passes continuously from the top of the vertical retort or retorts and the solid material which has been reacted passes continuously from the bottom of the vertical retort or retorts. In carrying out the process of the present invention, it is preferred to use vertical retorts of a type similar to those used in the manufacture of coal gas and known in that art as continuous vertical retorts.

The calcium sulphate used in the process of the present invention may be in any desired form, for example gypsum, but it is preferred to use substantially anhydrous calcium sulphate, for example natural anhydrite or calcined gypsum.

The carbonaceous material may be any such material which does not give rise to objectionable products on heating to the temperature involved in the process, for example, coal, coke, or bitumen, but it is preferred to use coke breeze.

In general, the mixture charged to the process will contain calcium sulphate and carbonaceous material in proportions to satisfy the equation:

$$2CaSO_4 + C \rightarrow 2CaO + 2SO_2 + CO_2$$

 but the quantity of carbon may be varied and may be as high as one mole per mole of calcium sulphate.

Materials other than calcium sulphate, carbon and silica may be present in the mixture, and in particular those which will assist or take part in the reaction, for example acidic oxides such as alumina or substances which will give rise to such oxides having acidic properties under the reaction conditions.

It has been found that it is desirable for any such material to contain a high proportion of the required silica and that such material is more reactive when it is finely sub-divided. For example, finely ground sand and finely ground loam give good results. It has also been found that materials which will give rise to silica and other oxides in a reactive form under the reaction conditions, for example clays, give beneficial results. It is preferred to use a clay having a high proportion of silica, for example a common clay of the type used in the manufacture of cement and building bricks which, in general, contains silica and alumina in a ratio of about 2:1 by weight.

A preferred mixture of materials is anhydrite, coke breeze and silica or clay in which the amount of coke breeze may be sufficient to give up to 1 mole of carbon per mole of calcium sulphate and the amount of silica or clay is such that the moles of silica or the sum of the moles of silica and of alumina therein is up to two per mole of calcum sulphate. It has however been found that the best results are obtained when using a mixture comprising calcium sulphate, coke breeze and clay in such amounts as to give molar proportions of $CaSO_4 : C : SiO_2 + Al_2O_3$ of about $1:0.6:0.5$.

In order to obtain intimate contact between the components of the mixture charged to the process it is desirable for them to be ground to pass British Standard Fine Sieve No. 52 (295$\mu$) and preferably to pass British Standard Fine Sieve No. 100 (152$\mu$), and to be thoroughly mixed together by any suitable means before being charged to the process.

The components and/or the mixture may be dried if desired at any stage of their preparation.

In operating the process of the present invention, the mixture may be charged to the vertical retorts in the form of powder. It has been found preferable however to form the mixture into pieces of suitable size and shape, for example by granulating or by moulding. Such granulation or moulding may be done in known manner with the aid of a liquid bonding agent, for example water or an aqueous emulsion of bitumen.

It has been found that the granulation or moulding of the mixture to be charged to the process greatly reduces the formation of dust and consequently assists the production of substantially clean gas. The granulation or moulding of the mixture also reduces the formation of sintered masses within the vessels or retorts and allows for free passage of the evolved gases. The tendency to the formation of sintered masses within the vessels or retorts may be still further reduced by coating the granules or moulded pieces with material which is refractory at the temperatures employed in the process, for example, powdered limestone or chalk. If granulation is employed for the preparation of the mixture, this may be done by any known means, for example in a paddle or drum granulator, and if it is desired to coat the granules with refractory material, this material may be added, in powdered form, during the final stage of the granulation. If the granulation is done with the aid of water or water-containing bonding medium, the finished granules may be dried before being fed to the process.

It will be understood that a suitable size of granule or moulded piece will depend in some measure upon the dimensions of the vertical retorts being used, and should be such as to permit of the free flow of the material through the vertical retorts.

Although the process of the present invention may be operated with the temperature of the mixture within the range of 900° C. to 1400° C., it has been found preferable for the temperature to which the mixture is heated to be within the range of 1000° C. to 1250° C.

It will be understood that the above-mentioned temperatures are those of the mixture of reactants being treated and that the temperatures external to the vertical retorts will, in general, be somewhat higher.

In operating the process of the present invention the rate of charging the mixture of reactants to the process will of course depend on various factors, for example the dimensions of the vertical retorts and the time of heating required to ensure substantially complete reaction of the components. It has been found that when using the preferred mixture of anhydrite, coke breeze and clay in the form of granules of about 1/8" diameter, satisfactory results may be obtained in vertical retorts of small cross-section, for example 2½" internal diameter, if the rate of charging and the heat input to the retorts are such that the mixture is heated to 1000° C. during a period of up to 1½ hours and to between 1000° C. and 1150° C. for a period of up to 2½ hours.

In general it is necessary to cool the residue of solid material leaving the vertical retorts. This may be done by passing nitrogen or other inert gas into the vertical retorts. This also improves the rate of reaction by reducing the partial pressures of the gaseous products but has the disadvantage of reducing the proportion of sulphur dioxide in the gaseous products. For the latter reason it is preferred to use steam as this will equally improve the rate of reaction and can readily be condensed from the gaseous products. Furthermore the necessary steam may conveniently be generated by waste heat from the process, and any sulphur dioxide dissolved in the condensate may be readily stripped therefrom.

Some free sulphur is formed in the process of the present invention, in an amount which may be as high as 17% of the total sulphur evolved from the calcium sulphate charged to the process. Substantially all this free sulphur will leave the process with the gaseous products and it may be separated therefrom by known methods, for example in solid or liquid form, or it may be burnt directly by known methods and preferably with a controlled amount of added oxygen or air. Burning the free sulphur with added air will, of course, have the disadvantage of reducing somewhat the proportion of sulphur dioxide in the product gases.

Free sulphur which has been separated from the gaseous products may, of course, be burnt with oxygen or air by known methods and the resulting gas containing sulphur dioxide may be added to the gaseous products leaving the process in such quantities as desired to adjust the sulphur dioxide content of these to a predetermined value.

The concentration of sulphur dioxide in the product gases of the process of the present invention is, in general, of the order of 45% by volume, which is considerably higher than that obtained in the processes employed hitherto. The process of the present invention is therefore particularly advantageous for use in conjunction with known processes for the production of sulphuric acid as it enables smaller units of such plants to be used for a desired output. The process has the additional advantage that when a granulated or moulded mixture of reactants is used the substantial absence of dust in the product gases simplifies the cleaning operations before such gases are passed to the sulphuric acid chambers or converters.

The residual solid material from the process may contain some calcium sulphide and unreacted calcium sulphate, but may be suitable for various uses, depending on the proportions of the components of the feed-material. For example when little or no clay is present, the residue may be used as an agricultural quality lime, or when the quantities of acidic oxides in the mixture of reactants are suitable, it may be burnt, if necessary, after the addition of lime or other materials, to produce cement clinker.

It will be understood that in general the vertical retorts in which the mixture of reactants is heated by indirect means will be constructed of suitable refractory materials. Fused or high grade silica refractories may be used but it is preferred to employ neutral or basic refractories such as sillimanite, silicon carbide or magnesite as these are less reactive with the mixture of reactants.

The process of the present invention is further illustrated by the following Examples 1 and 2.

In these examples, gas compositions are by volume and gas volumes are measured at 20° C. and atmospheric pressure.

*Example 1*

A granular material of granule size 1/16" to 1/8" was prepared from a mixture containing 65% ground natural anhydrite, 5.3% coke breeze and 29.7% clay, by dry weight; the molar ratios $CaSO_4:C:SiO_2+Al_2O_3$ being 1:0.75:0.7. The analysis of this material was:

24.6% CaO     4.0% C
29.8% $SiO_2+Al_2O_3+Fe_2O_3$
34.3% $SO_3$     2.9% $CO_2$ and it was passed downwardly at the rate of 702 grams per hour through a vertical retort comprising a fused silica tube of 2½" internal diameter of which a length of three feet was externally heated so that the material therein was subjected to the temperatures during the periods of time as stated below:

Up to 1000° C. for a period of 48 minutes.
From 1000° C. to 1050° C. for a period of 12 minutes.
From 1050° C. to 1100° C. for a period of 12 minutes.
From 1100° C. to 1120° C. for a period of 84 minutes.

Free sulphur was evolved at the rate of 14.4 grams per hour and was removed from the product gases by passing these through water.

The total product gas rate, after condensation of the sulphur and of the combined water from the clay used, was 115 litres per hour. This gas had the following composition:

43.5% $SO_2$   1.6% $N_2$
54.5% $CO_2$   0.4% $O_2$

Solid residue left the bottom of the retort at the rate of 419 grams per hour. The average analysis of this residue was:

0.92% Sulphide S   44% CaO
44.3% $SiO_2 + Al_2O_3 + Fe_2O_3$
6.4% $CO_3$

Since the sulphur input was at the rate of 96.3 grams per hour and the sulphur in the residue was 14.6 grams per hour, the desulphurisation of the anhydrite was about 85%.

*Example 2*

A granular material of granule size $\frac{1}{16}''$ to $\frac{1}{8}''$ was prepared from a mixture containing 72.7% ground natural anhydrite, 4.7% coke breeze and 22.6% clay, by dry weight; the molar ratios $CaSO_4 : C : SiO_2 + Al_2O_3$ being 1:0.6:0.53. The analysis of the material was:

26.6% CaO   3.6% C
24% $SiO_2 + Al_2O_3 + Fe_2O_3$
38.9% $SO_3$   2.7% $CO_2$ and it was passed downwardly at the rate of 637 grams per hour through the vertical retort as in Example 3 except that the temperatures and heating periods were as follows:

Up to 1000° C. for a period of 48 minutes.
From 1000° C. to 1050° C. for a period of 36 minutes.
From 1050° C. to 1100° C. for a period of 42 minutes.
From 1100° C. to 1120° C. for a period of 42 minutes.

At the same time steam was passed upwardly through the retort at the rate of 100 grams per hour.

Free sulphur was evolved at the rate of 14.8 grams per hour and was removed from the product gases by passing these through water.

The total product gas rate, after condensation of the steam, free sulphur and the combined water from the clay used, was 107 litres per hour. This gas had the following composition:

43.7% $SO_2$, 53.3% $CO_2$, 2.4% $N_2$ and 0.6% $O_2$

A further 1.36 litres of $SO_2$ per hour were absorbed in the condensate which if added to the above raises the sulphur dioxide concentration to 44.4%.

Solid residue left the bottom of the retort at the rate of 406 grams per hour. The analysis of this residue was:

Nil % Sulphide S   45.5% CaO
40% $SiO_2 + Al_2O_3 + Fe_2O_3$
6.8% $SO_3$

The total sulphur input was at the rate of 99.2 grams per hour and that remaining in the residue was about 11 grams per hour, hence the desulphurisation of the anhydrite was about 89%.

We claim:
1. A continuous process for the production of sulphur dioxide which comprises charging into at least one vertical retort a mixture of solids containing calcium sulphate, carbonaceous material and silica, maintaining said mixture within the retort as a column of material flowing downwards, heating the retort externally so that the mixture during its downward flow is indirectly heated therein from the temperature at which it is charged into the retort to a temperature within the range of 900° C. to 1400° C., the said indirect heating taking place in the absence of added oxygen for sufficient time to insure substantial reaction of the components of the mixture, continuously withdrawing reacted solid residue from the bottom of the retort and recovering a gaseous mixture rich in sulphur dioxide from the top of the retort.

2. A process as claimed in claim 1 in which the carbonaceous material is present in the mixture in quantity to provide up to one mole of carbon per mole of calcium sulphate.

3. A continuous process for the production of sulphur dioxide which comprises charging into at least one vertical retort a mixture of solids containing calcium sulphate, carbonaceous material and clay in such quantities as to give molar proportions of $CaSO_4 : C : SiO_2 + Al_2O_3$ of about 1:0.6:0.5, maintaining said mixture within the retort as a column of material flowing downwards, heating the retort externally so that the mixture during its downward flow is indirectly heated therein from the temperature at which it is charged into the retort to a temperature within the range of 900° C. to 1400° C., the said indirect heating taking place in the absence of added oxygen for sufficient time to insure substantial reaction of the components of the mixture, continuously withdrawing reacted solid residue from the bottom of the retort and recovering a gaseous mixture rich in sulphur dioxide from the top of the retort.

4. A process as claimed in claim 3 in which the mixture is heated to a temperature within the range of 1000° C. to 1250° C.

5. A process as claimed in claim 3 in which the mixture is charged to the vertical retort in the form of granules prepared by grinding and mixing the components and then granulating with the aid of a liquid bonding agent.

6. A process as claimed in claim 3 in which the reacted solid residue being withdrawn from the bottom of the retort is cooled by passing steam upwardly through the retort.

References Cited in the file of this patent

UNITED STATES PATENTS

| Number | Name | Date |
|---|---|---|
| 1,198,817 | Bassett | Sept. 19, 1916 |
| 1,801,741 | Hasselbach | Apr. 21, 1931 |
| 2,141,228 | Singh | Dec. 27, 1938 |
| 2,222,740 | Bornemann et al. | Nov. 26, 1940 |
| 2,230,592 | Griessbach et al. | Feb. 4, 1941 |
| 2,232,099 | Jahn | Feb. 18, 1941 |
| 2,250,186 | Noll | July 22, 1941 |
| 2,252,279 | Zirngibl et al. | Aug. 12, 1941 |

FOREIGN PATENTS

| Number | Country | Date |
|---|---|---|
| 541,993 | Great Britain | Nov. 23, 1939 |